United States Patent [19]
Hwa et al.

[11] 3,968,077
[45] July 6, 1976

[54] METHOD OF STABILIZING POLYTHIOL REACTION PRODUCTS

[75] Inventors: Jesse C. H. Hwa, Stamford, Conn.; Jung Il Jin, Irvington, N.Y.

[73] Assignee: Stauffer Chemical Company, Westport, Conn.

[22] Filed: Aug. 14, 1974

[21] Appl. No.: 497,360

[52] U.S. Cl. .............................. 260/45.8 A; 260/79
[51] Int. Cl.² .......................................... C08K 5/00
[58] Field of Search ........... 106/19, 287 SC; 260/79, 260/42.24, 45.85 R, 45.85 T, 45.7 S, 45.8 A, 18 EP

[56] References Cited
UNITED STATES PATENTS

| | | | |
|---|---|---|---|
| 3,440,064 | 4/1969 | Ludwig | 106/287 SC |
| 3,635,880 | 1/1972 | Lamboy et al. | 260/79 |
| 3,674,525 | 7/1972 | Louthan | 106/287 SC |
| 3,676,395 | 7/1972 | Pied | 260/45.9 R |

Primary Examiner—M. J. Welsh
Attorney, Agent, or Firm—Daniel S. Ortiz

[57] ABSTRACT

The invention is a method of stabilizing a reaction mixture of a polythiol and sulfur. The method comprises contacting said reaction mixture with an effective amount of a stabilizing agent selected from the group consisting of epoxides, acid anhydrides and mixtures thereof.

4 Claims, No Drawings

METHOD OF STABILIZING POLYTHIOL REACTION PRODUCTS

BACKGROUND OF THE INVENTION

The reaction products of sulfur with polythiol compositions are well known. The character of said products can be varied from a soft, rubber-like composition to a hard, tough, resilient material by varying proportions of polythiol to sulfur. The reaction can be carried out between ambient temperatures and temperatures up to about 200°C. A basic catalyst is generally utilized to reduce reaction time.

The properties of polythiol-sulfur reaction products are unpredictable as they depend upon the temperature of the reaction, the reaction time, the amount of catalyst used, the concentration of the polythiol, the nature of the polythiol, and the temperature history of the reaction mixture.

As disclosed in U.S. Pat. No. 3,434,852, in order to provide material within a useful viscosity range, it is the custom to introduce viscosity improving or viscosity reducing agents into the plasticized sulfur composition.

Whenever a polythiol-sulfur composition is heated, the properties of the composition change. Viscosity improvers can be added to the plasticized sulfur composition to compensate for the increase in viscosity which accompanies heating of polythiol-sulfur reaction products. The viscosity of molten polythiol sulfur reaction compositions are stabilized by introducing monomercaptans into the reaction mixture along with the polythiols.

Reaction products of sulfur and polythiols and their methods of preparation are disclosed in U.S. Pat. Nos. 3,434,852, 3,734,753 and 3,453,126 and British Pat. No. 1,303,832.

It is an object of the present invention to provide a method of stabilizing the polythiol-sulfur reaction mixture so that the characteristics of said mixture do not change with subsequent heating and cooling of the product. It is a further object of the present invention to provide a method of stabilizing the viscosity of polythiol-sulfur reaction mixtures.

BRIEF DESCRIPTION OF THE INVENTION

According to the present invention, the reaction product of a polythiol and sulfur is stabilized by contacting the reaction mixture with an effective amount of an epoxide or an acid anhydride composition. After the epoxide or the acid anhydride composition or mixtures thereof are introduced into the polythiol-sulfur reaction mixture, the viscosity of said mixture is effectively stabilized. The reaction mixture then can be heated and cooled through several cycles without a noticeable change in the viscosity.

DETAILED DESCRIPTION OF THE INVENTION

The polythiol and sulfur are reacted in whatever ratio is necessary to provide a reaction mixture having the desired properties. Methods of reacting polythiols with sulfur are well known in the art. One object of reacting a polythiol with sulfur is to obtain a product having desired properties with respect to the viscosity of the molten mixture. This object is achieved according to the present invention by introducing an effective amount of an epoxide or acid anhydride or mixture thereof into the reaction mixture. The polythiols and sulfur are usually reacted in a weight ratio of polythiol: sulfur of from about 10:1 to about 1:99. The ratio of polythiol:sulfur utilized in the reaction mixture depends upon the physical properties desired in the final product. However, usually at least about 1.25 moles of sulfur is utilized for each mole of thiol in the polythiol being reacted.

The polythiol and sulfur are reacted at the required ratio for a sufficient length of time to produce a reaction mixture having the desired viscosity. When the reaction mixture reaches the desired viscosity, an effective amount of an epoxide or an acid anhydride is then introduced into said mixture. After the acid anhydride or epoxide is introduced into said mixture, the viscosity of said mixture remains constant over a prolonged period of heating. Usually, the sulfur and the polythiol are reacted at a temperature between about 100° and about 200°C. and preferably between about 130° and about 170°C.

The polythiols disclosed in U.S. Pat. No. 3,434,852 and U.S. Pat. No. 3,734,753 are useful in the practice of the present invention. It is preferred to use dithiols or dithiols with up to about 30% of trithiols and tetrathiols mixed therewith.

The preferred polythiols for use in the practice of the present invention are compounds of the formula: $A(SH)_x$ wherein A is a radical having a valence of x and containing 2 to about 30 carbon atoms and preferably 2 to about 20 carbon atoms inclusive. Each of said carbon atoms preferably has attached thereto not more than one SH group. Radical A is selected from the group consisting of (a) radicals containing carbon and hydrogen only, (b) radicals containing carbon, hydrogen and oxygen only, the oxygen being present as ether linkages, (c) radicals containing carbon, hydrogen and sulfur, the sulfur being present as monosulfide linkages and (d) radicals containing carbon, hydrogen, sulfur and oxygen wherein the sulfur is present as monosulfide linkages and the oxygen is present as ether linkages, (e) mixtures thereof; x is an integer of from 2 to 4 inclusive and preferably 2 or 3.

Typical radicals containing carbon and hydrogen include saturated aliphatic, unsaturated aliphatic, saturated cycloaliphatic, aromatic and combinations thereof.

Typical radicals containing carbon, hydrogen and oxygen, the oxygen being present as ether linkages, include saturated aliphatic, unsaturated aliphatic, saturated cycloaliphatic, unsaturated cycloaliphatic and aromatic radicals connected by one or more ether linkages.

Typical radicals containing carbon, hydrogen and sulfur; the sulfur being present as monosulfide linkages, include saturated aliphatic, unsaturated aliphatic, saturated cycloaliphatic and unsaturated cycloaliphatic connected by one or more monosulfide linkages.

Preferred compounds for prepartation of the stabilized polysulfide-sulfur compositions are compounds such as:

1,2-ethane-dithiol, 1,2-dipropanedithiol, 1,3-propanedithiol, 1,4-butane-dithiol, 1,2,3-propanetrithiol, bis(2-mercaptoethyl) ether, bis(3-mercaptopropyl)ether, bis(2-mercaptoethyl) sulfide, bis(3-mercaptopropyl) sulfide, 2-mercaptoethyl-4-mercaptocyclohexylsulfide, bis(3-mercaptocyclopentyl) sulfide, 1,6-hexanedithiol, 1,20-eicosyldithiol, bis(3,6-dioxa-8-mercapto-octyl)sulfide and the like.

The polythiol composition is usually reacted with sulfur in the presence of a basic catalyst at a temperature above the melting point of sulfur. Basic catalysts useful in the practice of the present invention include materials such a calcium carbonate, sodium carbonate and tertiary amines, basic oxides such as calcium oxide, and titanium dioxide, alkali metal sulfides such as sodium sulfide, potassium sulfide and the like. Basic catalysts act as proton acceptors under the conditions of the reaction. Catalysts remain in the reaction mixture during the reaction.

While it is preferred to utilize a catalyst to carry out the reaction, a catalyst is not required if prolonged reaction times are not objectionable.

Reaction between the polythiol and sulfur can be readily carried out by mixing the sulfur and catalysts with the polythiol or by melting a mixture of the catalyst with the sulfur and introducing the polythiol into the molten reaction mixture. The reaction optionally can be carried out in the presence of a solvent. If a solvent is utilized, it is usually removed after the desired product has been prepared.

The ratio of polythiol to sulfur determines the properties of the final reaction product. Long chain polysulfides which have some cross-linking due to the addition of tri- and tetrathiols provide a harder, more rigid plasticized sulfur composition. Longer reaction times provide for harder, higher strength plasticized sulfur compositions. However, large amounts of polythiol composition can provide for preparation of relatively rubberlike compositions. The desired end use for the reaction product determines the reaction times, amounts of polythiol and the amount of cross-linking which may be required. Since the characterization of the reaction is determined by the end use of the composition, one skilled in the art can determine the amount and type of reactants which may be required to be reacted with the sulfur.

The effective amount of acid anhydride or epoxide composition is an amount sufficient to react with the thiol groups which remain unreacted in the reaction mixture. If a diepoxide is utilized, it is preferred that more than a sufficient number of epoxide groups be provided to the reaction mixture to react with the unreacted thiol groups since polyepoxides can extend the chain length of the reaction mixture and the properties of the reaction mixture can only be stabilized if the same number of epoxide groups on a poly-epoxide is at least 1½ to 2 times the number of unreacted thiol groups in the reaction mixture. Since the epoxides or the anhydrides react in the mixture and are not harmful, it is usually preferred to utilize from about 1½ to 2 times the number of reactive epoxide or anhydride moieties per mole of unreacted thiol in the reaction mixture. A monoepoxide is only necessary to provide the stoichiometric number of epoxide moieties to react with the unreacted thiol groups. However, an excess of monoepoxide compositions is not harmful to the mixture. It is preferred to utilize from about 1.25 to about 3 reactive moieties for each unreactive thiol group in the reaction mixture. The epoxide and acid anhydride stabilized polythiol-sulfur reaction mixtures have a more agreeable odor than polythiol sulfur compositions stabilized with monomercaptan compositions.

In general, the epoxide compositions useful in the practice of the present invention are those having one or more three membered heterocyclic rings containing one oxygen atom and 2 carbon atoms. The compounds are included within the following general formula:

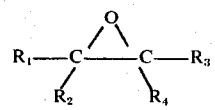

wherein $R_1$, $R_2$, $R_3$ and $R_4$ are independently selected from the group consisting of hydrogen, alkyl groups containing from 1 to about 10 carbon atoms, cycloalkyl groups, aryl groups, hydroxy groups and various derivatives of the aforementioned groups, particularly derivatives containing oxy and/or oxo linkages. The preferred class of epoxides are mono-epoxides which include alkylene oxides such as ethylene oxide, propylene oxide, butylene oxide, substituted alkylene oxides, cycloalkylene oxides, such as cyclohexane oxide, epoxides, vegetable oils, aryl epoxides such as 1,2-epoxyethylbenzene, 1,2-epoxy-3-phenoxypropane and the like. Thiol epoxides as stated above are also useful to stabilize the polythiol sulfur reaction mixture, but they must be provided in excess of the reactable thiol groups to stabilize the product.

The anhydrides of alkyl, cycloalkyl, or aryl acids can also be utilized to stabilize the polythiol sulfur reaction product. Acid anhydride compositions such as phthalic anhydride, acetic anhydride, propionic anhydride, succinic anhydride, malonic anhydride and the like are useful for stabilizing the polythiol sulfur reaction product in the practice of the present invention. The stabilized polysulfide compositions prepared by the practice of the present invention can vary from soft, flexible, rubber-like material to hard, tough, resilient materials depending upon the polythiol utilized and the ratio of polythiol:sulfur in the reaction mixture.

The stabilized polythiol sulfur reaction mixtures of the present invention are useful in that the character of the reaction mixture does not change after heating or manipulation of the stabilized reaction mixture. The stabilized polythiol-sulfur reaction products of the present invention are useful in several applications such as in laying brick, marking roads, coating soluble fertilizer products to reduce the rate of solution; and for structural uses such as sewer pipe and the like.

The process of the present invention can be illustrated by reference to the following examples:

EXAMPLE 1

A mixture of 24 grams (0.75 mole) of sublimed sulfur and 0.5 grams of $TiO_2$ catalyst was heated to 120°C. With stirring, 33.56 grams (0.24 mole) of $\beta,\beta_1$-dimercaptodiethyl ether (DMDEE) was added to the molten mixture over a period of 40 minutes, during which time the temperature of reaction mixture was raised to 155°C. After the addition of DMDEE was over, the reaction mixture was permitted to remain at 155°C. for an additional 20 minutes. At this time, 0.9 grams of styrene oxide was added to the mixture and allowed to react for 30 minutes. The reaction product was a readily flowing liquid at 100°–150°C.

The viscosity did not increase after the styrene oxide was added to the reaction mixture.

EXAMPLE 2

Sulfur (297.5 grams) was heated to 130°C. under nitrogen. With stirring, 51.5 grams of $\beta,\beta$-dimercaptodiethyl ether (DMDEE) was slowly added to the molten sulfur over a period of one hour while the reaction temperature was maintained between 100° and 145°C. The mixture was permitted to react for an additional 3 hours and at that time 1.5 grams of styrene oxide was added to the reaction mixture. The melt viscosity of the product did not increase and was stable.

One can use diepoxides such as 1,4-butanediglycidyl ether, ethylene glycol diglycidyl ether, or polyepoxides such as polyepoxide resins and epoxidized soy bean oil, in the place of the monoepoxide. In addition to the reaction product stabilization, the polyepoxides will result in chain extending or branching and cross-linking depending upon the functionality and concentration of epoxide used.

EXAMPLE 3

A mixture of 85.5 grams (2.67 moles) sulfur and 0.1 grams of TiO$_2$ catalyst was heated to 145°C. To the stirred molten mixture of sulfur and TiO$_2$ was added 62.8 grams (.67 mole) of ethane dithiol (HSCH$_2$CH$_2$SH) for a period of 1.5 hours. After the addition of the ethane dithiol was completed, the reaction mixture was maintained at 145°C. for an additional 3 hours. At this time 0.5 grams of phthalic anhydride was added to the reaction mixture and the mixture was then maintained at 145°C. for 0.5 hours. The reaction mixture was viscous but the melt viscosity did not increase with further heating.

EXAMPLE 4

A mixture of 9.7 grams (0.303 moles) of sulfur and 0.1 grams of TiO$_2$ at 140°C. were added to 13.39 grams (0.097 moles) of dimercapto diethyl ether and 1.03 grams (0.003 moles) of trimethylol ethane trithiolglycolate

over a one hour period. The mixture was heated at 140°C. for an additional 3 hours. Then 0.2 grams of styrene oxide were added to the reaction mixture. The reaction mixture was permitted to remain at 140°C. for 30 minutes after the addition of styrene oxide. After the addition of styrene oxide, the viscosity of the mixture did not increase. The reaction mixture was cooled and a rubber-like material was formed.

What is claimed is:

1. A method of stabilizing a reaction composition of a polythiol and sulfur which comprises contacting said composition with an effective amount of an epoxide stabilizing agent.

2. The method of claim 1 wherein the said composition is contacted with an effective amount of said stabilizing agent at a temperature between about 100° and 200°C.

3. A method of stabilizing a reaction composition of a polythiol and sulfur which comprises contacting said composition with an effective amount of a stabilizing agent selected from the group consisting of ethylene oxide, propylene oxide, butylene oxide, cyclohexane oxide, epoxidized vegetable oils, 1,2-epoxyethylbenzene, 1,2-epoxy-3-phenoxypropane, acetic anhydride, propionic anhydride, malonic anhydride and mixtures thereof.

4. The method of claim 3 wherein the said composition is contacted with an effective amount of said stabilizing agent at a temperature between about 100° and 200°C.

* * * * *